(12) United States Patent
Bennett et al.

(10) Patent No.: US 8,781,975 B2
(45) Date of Patent: Jul. 15, 2014

(54) SYSTEM AND METHOD OF FRAUD REDUCTION

(75) Inventors: Naftali Bennett, New York, NY (US); Lior Golan, Tel Aviv (IL); Nira Rivner, Ramat Gan (IL)

(73) Assignee: EMC Corporation, Hopkinton, MA (US)

( * ) Notice: Subject to any disclaimer, the term of this patent is extended or adjusted under 35 U.S.C. 154(b) by 1436 days.

(21) Appl. No.: 11/134,479

(22) Filed: May 23, 2005

(65) Prior Publication Data

US 2005/0273442 A1    Dec. 8, 2005

Related U.S. Application Data

(60) Provisional application No. 60/572,776, filed on May 21, 2004.

(51) Int. Cl.
*G06Q 20/00* (2012.01)

(52) U.S. Cl.
USPC .......................................................... 705/67

(58) Field of Classification Search
USPC .............. 705/67, 16, 21, 59, 71; 380/44, 262, 380/278, 279
See application file for complete search history.

(56) References Cited

U.S. PATENT DOCUMENTS

| | | | |
|---|---|---|---|
| 4,858,117 A | 8/1989 | DiChiara et al. | |
| 5,708,422 A | 1/1998 | Blonder et al. | |
| 5,819,226 A | 10/1998 | Gopinathan et al. | |
| 5,903,721 A | 5/1999 | Sixtus | |
| 6,049,787 A | 4/2000 | Takahashi et al. | |
| 6,064,972 A | 5/2000 | Jankowitz et al. | |
| 6,105,010 A | 8/2000 | Musgrave | |
| 6,233,565 B1 | 5/2001 | Lewis et al. | |
| 6,330,546 B1 | 12/2001 | Gopinathan et al. | |
| 6,496,936 B1 | 12/2002 | French et al. | |
| 6,668,323 B1 | 12/2003 | Challener et al. | |
| 6,853,988 B1 | 2/2005 | Dickinson et al. | |
| 6,880,088 B1 | 4/2005 | Gazier et al. | |
| 7,051,003 B1 | 5/2006 | Kobata et al. | |
| 7,107,295 B2 | 9/2006 | Shimizu et al. | |
| 7,249,112 B2 | 7/2007 | Berardi et al. | |

(Continued)

FOREIGN PATENT DOCUMENTS

| EP | 0 534 673 | 3/1993 |
|---|---|---|
| EP | 1 176 489 | 1/2002 |

(Continued)

OTHER PUBLICATIONS

International Search Report for International Application No. PCT/US04/29690 mailed Mar. 9, 2007.

(Continued)

*Primary Examiner* — Calvin L Hewitt, II
(74) *Attorney, Agent, or Firm* — BainwoodHuang

(57) ABSTRACT

A system and method may allow for extending authentication to a two factor, out of band form, requiring an additional data element or code via a channel different from the channel used for the primary transaction, where the different channel has the attribute that it is difficult or costly to achieve many access points to it, and it is possible to limit the number of users associated with a particular access point to it.

19 Claims, 4 Drawing Sheets

(56) References Cited

U.S. PATENT DOCUMENTS

| | | |
|---|---|---|
| 7,631,193 B1 | 12/2009 | Hoffman |
| 2003/0101348 A1* | 5/2003 | Russo et al. .................. 713/185 |
| 2003/0163739 A1* | 8/2003 | Armington et al. ........... 713/202 |
| 2003/0172272 A1* | 9/2003 | Ehlers et al. .................. 713/170 |
| 2003/0174823 A1* | 9/2003 | Justice et al. ................. 379/145 |
| 2003/0177246 A1 | 9/2003 | Goodman et al. |
| 2004/0044621 A1 | 3/2004 | Huang et al. |
| 2004/0199462 A1* | 10/2004 | Starrs .............................. 705/39 |
| 2004/0215574 A1* | 10/2004 | Michelsen et al. .............. 705/64 |
| 2004/0230527 A1* | 11/2004 | Hansen et al. .................. 705/40 |
| 2004/0243832 A1* | 12/2004 | Wilf et al. ...................... 713/200 |
| 2004/0260651 A1* | 12/2004 | Chan et al. ....................... 705/50 |
| 2005/0097320 A1* | 5/2005 | Golan et al. ................... 713/166 |
| 2005/0144279 A1* | 6/2005 | Wexelblat ...................... 709/225 |
| 2009/0089869 A1* | 4/2009 | Varghese ........................... 726/7 |
| 2012/0109824 A1* | 5/2012 | Takatori et al. ................. 705/44 |

FOREIGN PATENT DOCUMENTS

| | | |
|---|---|---|
| EP | 1 339 199 | 8/2003 |
| JP | 11-212922 | 8/1999 |
| JP | 2002-304522 | 10/2002 |
| JP | 2003-006161 | 1/2003 |
| JP | 2003-091509 | 3/2003 |
| JP | 2003-091650 | 3/2003 |
| JP | 2003-196566 | 7/2003 |
| WO | WO 99/60482 | 11/1999 |
| WO | WO 01/22651 | 3/2001 |
| WO | WO 01/90861 | 11/2001 |

OTHER PUBLICATIONS

Supplementary European Search Report for Application No. EP 04 80 9730 dated Dec. 11, 2008.

International Search Report for International Application No. PCT/US05/18102 mailed May 23, 2007.

* cited by examiner

SYSTEM AND METHOD OF FRAUD REDUCTION

RELATED APPLICATION DATA

The present application claims benefit from prior provisional application Ser. No. 60/572,776 entitled "System and Method of Fraud Reduction", filed on May 21, 2004, incorporated by reference herein in its entirety.

FIELD OF THE INVENTION

The present invention relates to authentication; more specifically the present invention may be used, for example, in authenticating parties in a transaction.

BACKGROUND

In parallel to the growth in use of online channels for accessing a variety of services, and performing a variety of transactions, identity theft has reached epidemic levels, and online account takeover and transaction fraud is growing at an enormous rate. Parties committing fraud ("fraudsters") have new technologies at their disposal: for example "Trojan horses" and key loggers may be installed in unsuspecting customers' computers, transmitting personal information back to the fraudster; and phishing attacks may trick consumers into giving up personal and financial information (for example without limitation: social security number ("SSN"), account numbers, banking information, user names and passwords for various services, personal identification numbers ("PINs"), credit card numbers, which may be referred to as for example "user Credentials" or "Credentials").

Recent scams show a sophisticated, determined, innovative and well organized online crime wave. Fraudsters are more adaptive than ever, modifying their modus operandi and techniques quickly to exploit new vulnerabilities. While the fraudsters do not limit themselves to a specific sector, their main focus is on the banking and financial accounts sectors (other sectors prone to fraud are government services, ISPs, telecom companies and healthcare and many others).

One issue is authentication—how does a service or transaction provider know whether a certain user accessing a service and performing actions at a certain site is who he or she claims to be. Using the combination of a login and password alone (which still are the most prevalent method of authentication) may not be satisfactory.

Many solutions have been proposed for the problem of authentication, however many of them encounter an imbalance between usability vs. security: they are either not secure enough, or, when security is enhanced to satisfactory levels, they are cumbersome and expensive to deploy and operate.

Various service providers may use Credentials in order to authenticate users in remote applications. Authentication may be required whenever a sensitive operation takes place, for example, viewing personal information, performing financial transactions, updating the user's profile and more.

During authentication the user may usually be required to supply a pre-established password and optionally an additional shared secret between the user and the service provider. Users' credentials may enable access to sensitive information as well as funds, and therefore getting hold of them has become a popular criminal activity Stealing users' credentials may be done in various ways. For example, theft of a file containing credentials from the bank or a third party (including an "inside job"), a large and successful "Phishing" attack, keyboard sniffing and more.

When faced with a major theft of user credentials, the service provider may execute one or more of the following options:

Provider may operate its business at a much higher risk level, for example, may check and analyze transactions to make sure no fraudulent activity takes place.

Provider may perform a costly operation of changing the user credentials or deploying a new authentication mechanism.

Provider may shut down parts of the business in case the other two options may not be acceptable.

Provider may perform other sets of actions.

The service provider may not have any external alert as to the occurrence of a massive credential theft. For example, it may not know when a large set of credentials is stolen by an insider job, or from a third party service provider. In addition, even when a large theft may be known, like in the case of a large phishing attempt, the service provider may not know when the stolen credentials will actually be used.

Service providers may be therefore looking for alternative authentication options. Some of the alternative solutions offered today are:

1. Provider may ask for shared secret information that changes over time and may be therefore more difficult to obtain or that may lose its value after some time, as it becomes irrelevant, for example, details about recent transactions, or invoicing.

2. Provider may ask for random parts of shared secret information, for example, random digits of the password, or random data elements out of a set of known data elements 3. Mobile or telephone authentication, for example, mobile telephone may be pre-registered to the service and may be used to authenticate the user 4. Token based authentication The current solutions may not be satisfactory, since none of them may strike a good balance between security and usability. Either they may not be secure enough, for example, asking for random pieces of a shared secret, information which may easily be obtained during the initial user credentials theft, may not be usable enough or may be too expensive to actually deploy, for example, token authentication which may be expensive to implement, may require customer education, and deployment ahead of time to all users.

SUMMARY

Embodiments of the present invention may relate to a method and system for addressing massive theft (or suspected theft) of identification information used in order to access services that contain, for example, confidential information of the users of those services, services where the user can perform sensitive operations or other services. Such identifying information may include but is not limited to, for example, user-names, codes, passwords of any form, or any other personal identifying data that can be used in order to access services that contain confidential information (referred herein as "Credentials" or "User Credentials").

Embodiments of the present invention may relate to a method and/or system for authenticating a user participating in a transaction, for example, a financial transaction, opening an account, etc. A user may communicate with an institution via a first communication channel such as for example the Internet and a web site. The system may transmit a data element, for example a code, to the user via a second communication channel, (the identification of which may be provided by the user, or may be generated in another manner), for example, a telephone connection, e-mail connection etc. The authentication system may receive the data element from the user via the first communication channel and may determine, based on the data element, if the user is allowed to perform a transaction. In some embodiments, the transmitting of the data element to a user and receiving the data element from the user may be done only if an alert level is not sufficient, or is a certain level. The authentication system may allow the user to proceed with the transaction only if the data element received via the second communication channel is supplied correctly via a first communication channel, for example, the received code matches the sent code. In some embodiments the first communication channel may be a telephone connection while the second communication channel may be the Internet; other suitable channels may be used. The second communication channel may or may not be the communication channel by which the transaction is conducted.

A system and method according to one embodiment may, during a transaction with a user, transmit to the user, via a first communication channel, a code; and receive from the user, via a second communication channel, the code. The transaction may proceed, or the user may be authenticated, if the code matches. A system and method according to one embodiment may conduct transactions with a number of users, ensuring that for each of a set of first communications channels, only a certain number of users can use a particular access point to that first communication channel. The second communication channel may be the communication channel by which the transaction is conducted; but in alternate embodiments need not be.

Some embodiments of the present invention may relate to a method and/or system for authenticating a user participating in a transaction, for example, a financial transaction, opening an account, a password recovery, etc. A user may communicate with an institution via a communication channel such as for example the Internet and a web site. The system may transmit a data element, for example a code, to the user via a different communication channel (the identification of which may be provided by e.g. the user, or may be generated in another manner), for example, a telephone connection, e-mail connection etc.

The authentication system may receive the data element from the user via a communication channel and may determine, based on the data element, if the user is allowed to perform a transaction. In some embodiments one of the communication channels may have characteristics that it may be difficult and/or expensive to obtain many access points to it. In some embodiments, the transmitting of the data element to a user and receiving the data element from the user may be done when there is a greater probability of transaction risk. The authentication system may allow the user to proceed with the transaction only if the data element received via one communication channel is supplied correctly via a different communication channel, for example, the received code matches the sent code. In some embodiments one communication channel may be a telephone connection while the other communication channel may be the Internet; other suitable channels may be used The other communication channel may or may not be the communication channel by which the transaction is conducted. Some embodiment of the present invention may include initiating contacting with a user via one of the communication channels.

A system and method according to one embodiment may, during a transaction with a user, transmit to the user, via one communication channel, a code; and receive from the user, via a different communication channel, the code. The transaction may proceed, or the user may be authenticated, if the code matches. A system and method according to one embodiment may conduct transactions with a number of users, ensuring that for each one of the communication channels, only a certain number of users can use each access point to such communication channel. One of the communication channels may be the communication channel by which the transaction is conducted; but in alternate embodiments need not be. In some embodiments the code may be transmitted only on the suspicion as to the existence of a certain risk level. The risk level may be related to the transaction in some embodiments; but in alternate embodiments the risk level may be related to an event outside of the transaction. In some embodiments it may be possible to limit the number of users who may use an access point to one of the communication channels, for example, no more than N users may be permitted to use an access point to one of the communication channels. In some embodiments the access point to one of the communication channels may be invalid if, for example, it has existed for fewer than N days. The identity of the access point to one of the communication channels may be collected before a transaction or during a transaction.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
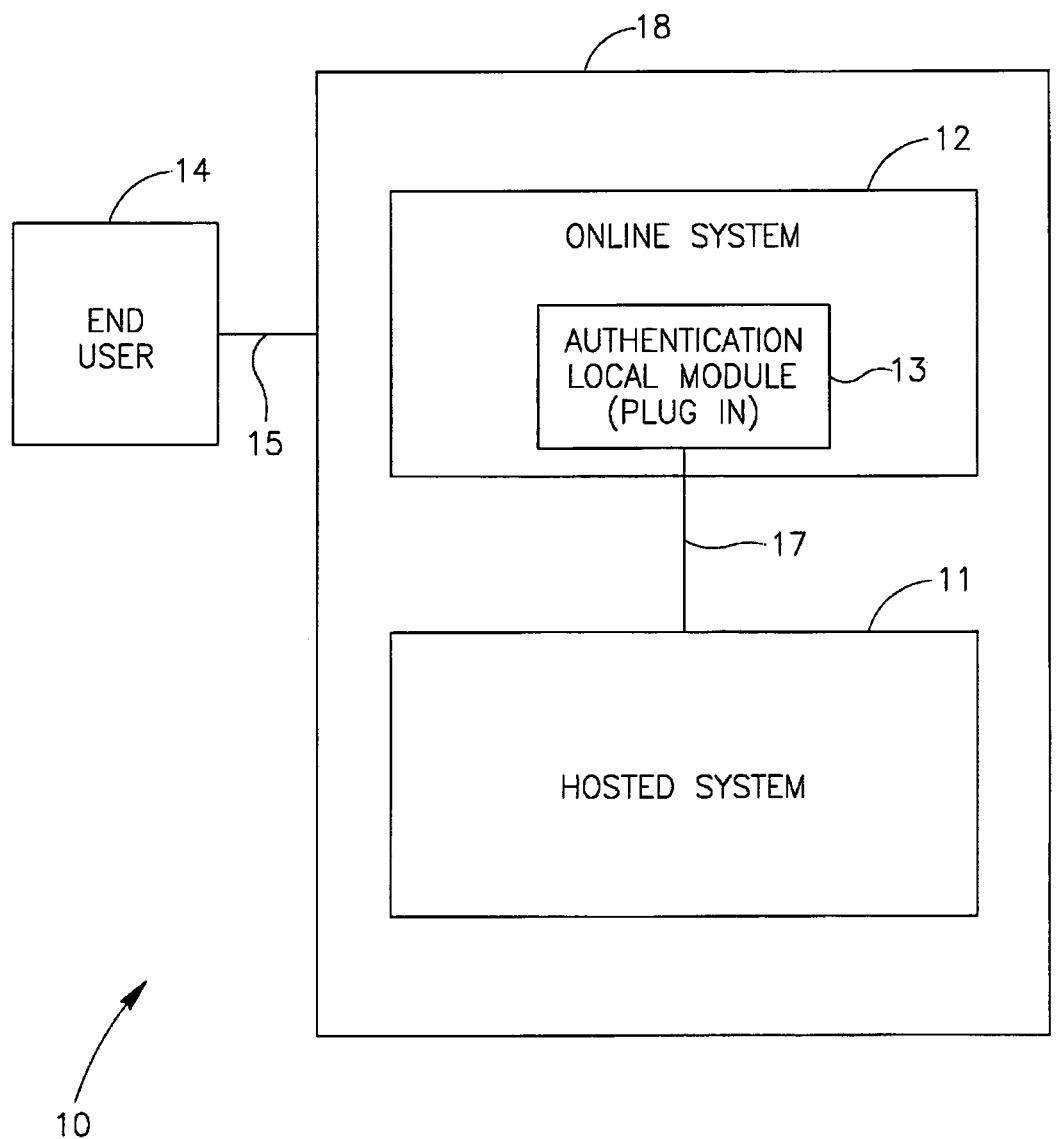
FIG. 1 depicts an authentication system according to one embodiment of the present invention.

Reference numerals may be repeated among the figures to indicate corresponding or analogous elements.

DETAILED DESCRIPTION

In the following detailed description, numerous specific details are set forth in order to provide a thorough understanding of the invention. However it will be understood by those of ordinary skill in the art that the present invention may be practiced without these specific details. In other instances, well-known methods, procedures, components and circuits have not been described in detail so as not to obscure the present invention. Various modifications to the described embodiments will be apparent to those with skill in the art, and the general principles defined herein may be applied to other embodiments. The present invention is not intended to be limited to the particular embodiments shown and described.

Unless specifically stated otherwise, as apparent from the following discussions, it is appreciated that throughout the specification, discussions utilizing terms such as "processing," "computing," "calculating," "determining," or the like, may refer in whole or in part to the action and/or processes of a processor, computer or computing system, or similar electronic computing device, that manipulate and/or transform data represented as physical, such as electronic, quantities within the system's registers and/or memories into other data similarly represented as physical quantities within the system's memories, registers or other such information storage, transmission or display devices.

The processes presented herein are not inherently related to any particular computer, processing device, article or other apparatus. An example of a structure for a variety of these systems will appear from the description below. In addition, embodiments of the present invention are not described with reference to any particular processor, programming language, machine code, etc. It will be appreciated that a variety of programming languages, machine codes, etc. may be used to implement the teachings of the invention as described herein.

Embodiments of the invention may be used so Service Providers that may provide services containing confidential information, will be able to continue providing access to such services to their users, for example, in the face of massive theft, or suspected theft of credentials of the users of their services. It will be appreciated, however that the present invention may not be limited to usage by service providers, but rather may also be used by the government, and any other authority or entity that offers access to information of confidential or private nature.

A system and method may allow for extending authentication to a two factor, out of band form, requiring for example an additional data element or code via a channel different from the channel used for the primary transaction. The system may contact a user who may wish to conduct a transaction via a communication channel, which may be the communication channel of conducting the transaction or an additional communication channel, and provide the user with a secret, for example, a code or a data element. The user may provide the system with the secret via a communication channel which is different from the channel the secret may be received by. For example, a user may log in to a web via the Internet and the system may contact the user by sending a SMS with a code to the user's mobile telephone. The user may enter the code received via the second channel (e g., the mobile phone) via the first channel (e.g., the Internet) in order to access the system. In another embodiment the user may receive the code via the first channel (e.g., the Internet) and the system may contact the user via the second channel, for example a landline telephone and may request the user to supply the code via the second channel. In other embodiments the user may contact the system via a second channel and may supply the secret via a first or a second channel.

An embodiment of the invention and system may be used, for example, by financial institutions (FIs), or non-financial institutions to address massive credentials theft or suspected theft of their users and members. The present invention may be relevant to anyone that operates a service requiring remote customer access using some form of credentials and that may be subjected to any kind of credential exposure. An FI that may be using an embodiment of the invention may not be required to distribute any hardware ahead of time, nor may it be required to educate its users. The FI may deploy a method according to one embodiment exactly when needed and where needed. An embodiment of the invention may therefore provide a high level of protection against any kind of theft of credentials, at low cost.

Some embodiments of the present invention may include a system and/or method which may provide flexible transaction processing based on for example the risk assessment or risk level of a transaction and/or a user or party to a transaction. For example, based on a risk level, a level of authentication or other aspects of a transaction may be set or altered.

It will be appreciated by persons skilled in the art that this system and method may not be limited to use by financial institutions, but rather by any Service provider, that users may be required to authenticate themselves in order to gain access to the services. Moreover, in some embodiments reference may be made to a telephone and a telephone number, as the second factor for the authentication. While a telephone line and number may correspond to the requirements defined herein for the second communication channel, it should be appreciated by persons skilled in the art that other communication channels may be used as well, and the telephone may be used in order to provide a simple illustration of a certain embodiments of this invention.

It will also be appreciated by persons skilled in the art that the "Users" referred to herein, could be individuals as well as corporations and other legal entities. The alert levels or levels of fraud alert referred to in the following sections may be intended as an illustration and there may be many other configurations intended to distinguish between various levels of fraud attack or suspected attack.

The system and method described herein may be implemented whenever massive Credentials' theft may occur, as well as when it is suspected to have occurred, or anytime.

One of the advantages of an embodiment of the invention is that it may be deployed immediately when needed and where needed, and may have very low operational and deployment costs, moreover, it may not require prior access such as, for example, pre-enrolment, or pre-distribution of hardware to users, who may be potential victims of such theft.

An embodiment of the invention may extend authentication to a two-factor out-of-band form, requiring an additional data element, in addition to the credentials, to be transmitted to the user via a different channel. In one embodiment such second channel may be, but is not limited to a mobile telephone or a landline telephone, or a pager, or any channel that has the characteristic that it is difficult either logistically, money-wise, or time-wise, to obtain access to many access points to it, for example, it may be difficult and/or expensive to own numerous telephone lines, or mobile numbers or beeper numbers, and in a preferable embodiment of this invention, it may be widely available and easy to access by users (on an individual basis). Channels not having such characteristics may be used for out-of-band communication.

It should be noted that unlike typical two-factor authentication methods, the additional authentication channel (e.g., a channel used outside a normal process or channel for authentication or identification) may not be previously uniquely linked to a user, and therefore there may not be a need for prior access to the users, for example, in the form of registration, distribution of hardware or education of users, prior to deploying a method according to one embodiment.

In one embodiment, the system may ensure that for each of an out-of-band or secondary communication channel, only one or a certain number of users or accounts can use this channel for authentication. Security may be achieved by for example limiting the number of different user service accounts that may use the same authentication channel. For example, if the service is a bank account, such limitation may be achieved by limiting the number of bank accounts that may be linked to a certain telephone number, or by limiting the number of users who may link their accounts to that telephone number, based on for example name/SSN/whether they are members of the same family, and by deploying as part of a method according to one embodiment only those channels that may have the characteristic that it may be difficult (e.g., logistically, money-wise, or time-wise) to obtain access to many access points to it. For example, it may be both expensive and logistically difficult to obtain access to a significant number of land-line telephone numbers.

The deployment of an embodiment of the invention may be governed and set according to criteria intended to specify the level of the threat of fraud. It may also be applied selectively to users according to various criteria intended to assess the probability of fraud, for example, at various levels of fraud users logging into a service from their typical IP location may be exempt from a method according to one embodiment, or users who may perform a successful out of band authentication, for example from a certain location (such as computer or ATM machine) may be exempt from extra authentication in their next attempt to access the service from the same location).

Embodiments of the invention may pertain to a two factor authentications using a communication channel that meets certain criteria. Users may be authenticated using a combination of their regular Credentials and proof that the user may have access to a communication channel that meets the criteria of this method, for example, without limitation, such proof could be delivered by the user presenting a dynamic piece of data that may be delivered to it via a communication channel that meets the criteria of this method, by the user showing it knows the content of this dynamic data, or by the user initiating a call from a telephone or a channel to a certain telephone number. The criteria that the additional communication channel may need to meet under this method, may be that it would be difficult and/or cumbersome and/or expensive to obtain a significant number of it, for example, without limitation, it is expensive and cumbersome to obtain numerous telephone or mobile telephone numbers including access to them. Security may be achieved not only by selecting such a type of communication channel for delivery of the dynamic password, but also by restricting the number of, for example, users or user accounts, or any other number of distinct values of a property of the users or accounts, such as owner name, SSN, billing address, that may be linked to a particular channel. This method may be used either with respect to users may have pre-registered the details of their secondary authentication channel, as well as with respect to users who may not pre-registered With respect to the latter, such details may be collected during the authentication session.

Other secondary communication channels having other characteristics, for example that may not be difficult to obtain, may be used.

This method may more generally be seen as a method for achieving a sufficient level of security in authentication not by actually validating user's identity but rather by (i) requiring users to provide details of "something" that may be either expensive, complicated or hard to achieve in large numbers (e.g., it may be something that meets the above criteria, but that may be readily available, such as for example, a telephone line); and (ii) by limiting the number of different user service accounts or users who may use the same "something" for authentication.

FIG. 1 depicts an authentication system 10 according to one embodiment of the present invention. Referring to FIG. 1, an end user 14 may use a terminal such as a personal computer, automated teller machine, PDA, telephone, cellular device, or other computing device may wish to conduct a transaction (e.g., login to a service, make a purchase, opening a financial account, etc.) with an institution 18. Institution 18 may be, for example, a provider that may provide services containing confidential or private information, for example, a financial institution ("FI") system, government agencies, health institution, communication service provider or any other institution, authority or entity. End user 14 and institution 18 may communicate, for example, via one or more communications network(s) 15 such as, for example, the Internet, a cellular system, intranets, data lines, a combination of networks, etc. In one embodiment, institution 18 may provide a web page which is displayed on the user's computer system; in such case a processor or controller executing a part of a method according to an embodiment of the invention may be located at an end user 14. The institution 18 may include a hosted system, which his not necessarily hosted outside of the institution ("HS") 11 and an online system ("OS") 12 which may include an authentication local module 13. In some embodiments of the present invention, the HS 11 may be located inside the institution 18 while in other embodiments the HS 11 may be, for example, located outside the institution 18, or may be a separate service which may be operated by the institution 18 or another service provider. For example, institution 18 may include OS 12, for example a system handling online transactions, and HS 11 may be a third-party provided system, physically and organizationally separate from institution 18. In such embodiments the HS 11 may communicate with the institution 18 via a plug in 13; plug in capability may be used if the HS is included within the institution 18. The OS 12 may be, for example, an online application hosted in a data center and may include an authentication local module 13 which may be, for example, a plug in unit which may be installed at a data center or another system in which the OS 12 may be hosted. The OS may belong to, for example, a bank or other financial institution, an online or other business, or any other institution conducting business.

The authentication local module 13 may be suitable for any system architecture which may be used by the OS, for example, J2EE, Microsoft Net, Microsoft ASP, or any other architecture. The authentication local module 13 may be substantially contained within the authentication local module 13 (e.g., a self contained software module(s)), or may be partially or wholly contained elsewhere For example, authentication local module 13 may be a plug-in or a shell which may communicate (e.g., via communications network 17, or via other methods) with a different authentication server, for example HS 11. In the event that all authentication, including out of channel authentication, is done at one institution (e.g., a bank), such local module may not be needed. Communication network 17 may be, for example a hard wired link, air link or any other communication channel. Furthermore, the authentication local module 13 may communicate with an authentication application in the HS 11 including, for example, a cryptographic validation of the HS 11 response to ensure, for example, that it is transacting with HS 11. A local module 13 need not be used; for example if all the functionality is included within one institution, a local module may not be used.

The HS 11 may include a set of units which may perform, control and execute the authentication process. For example the HS 11 may include an authentication application which may communicate with end user 14 and with authentication local module 13 and may generate the codes for the authentication. In addition HS 11 may include storing units, for example, a history database which may store end user information, a rule-based database which may contain system's configurable rules regarding, for example the use of the authentication process and a channel-user database which may hold, for example, a listing of end users and their channels. HS 11 may further include a set of engines, for example, a decision engine, a user-device tracking engine, an external communication engine or any other engine.

In accordance with some embodiments of the invention, authentication may be extended to a two-factor out-of-band form by, for example, requiring an additional piece of data to be transmitted through a different channel, or by requiring any other type of proof that a user may have access to a second channel. A channel may be any form of communication, such as a website, a telephone line, email, postal mail, a chat-room, instant messaging, etc. For example, during a transaction, or during a log-in procedure or authentication procedure that is part of a transaction, a user may be communicating via a first channel, such as the Internet and a web-site. To provide further authentication, the system may contact the user via a second (e.g., "out of band") channel, such as via email or via a telephone call, and provide the user with a code. The user must then enter the code at the website to continue the transaction. Alternately, the user may receive the code or secret item via the communication channel by which the transaction is being conducted and send the code via a second channel, for example telephoning the entity conducting the transaction, or a related entity, with a code received via, for example a website. Either the user or the institution may initiate communication via the second channel.

In one embodiment, a system such as the authentication system 18 or another suitable system may receive a user request to begin a transaction, or information on a transaction and/or a user wishing to participate in the transaction (e.g., a financial transaction, opening an account, etc.) via communication network 15. The request may be via a first channel, such as over the Internet via a website. For example, a user may log on to a bank website and wish to transfer funds. The end user 14 may authenticate itself using credentials such as, for example, user ID and password ("Regular authentication"). The HS 11 may complete the regular authentication and may log the end user 14 to the authentication system 18.

Based on the alert level of a transaction and specific user characteristics (which can be determined at the HS) HS 11 may activate the authentication local module 13 in the OS 12. In other embodiments an alert level or user characteristics need not be used as a factor in initiating a secondary authentication or an authentication on a second channel, and alert levels or user characteristics need not be used. For example, a second authentication channel may always be used. The authentication local module 13 may link the session with a proxy number that may be used while communicating with the HS 11 for security reasons and may redirect the end user 14 to the HS 11 authentication process The HS 11 may operate a decision engine which may decide based on, for example, the alert level, configuration rules, user's characteristic or any other information, wheatear authentication should take place.

In the case that an additional or secondary authentication process should take place, the HS 11 may request the end user 14 to enter or use an additional communication channel, or may communicate with the user via a second authentication channel Such channel may be, but is not limited to, for example, a mobile phone, a landline telephone, a pager or any other channel that in one embodiment has the characteristic that is difficult, either logistically, money-wise, or time-wise, to obtain access to the channel by many access points or to repeatedly use. Other secondary channels may be used, such as postal mail, instant messaging, email, or other channels. Furthermore the HS 11 may contact the end user by operating an external communication engine, for example, a telephone operator, a short message center, or any other communication engine which may contact the end user 14 and may send a completion code which may be generated by the HS 11 earlier. The end user 14 may be asked by the HS 11 to enter the completion code to the system, for example by the first channel. In case the user 14 supplies a wrong completion code, the HS 11 may allow the end user 14 to enter another code according to a predetermined number of times allowed until the HS 11 may fail the authentication process, for example fail the user 14 login. The HS 11 may check and approve the completion code and may sign the response and may send a notification, for example, an HTML page that may redirect the user browser to the HS in addition the HS 11 may send a response including user characteristics, for example, user ID, proxy session ID, authentication code and the like. The authentication local module 13 may navigate the end user 14 to access the internal system by, for example, switching the proxy session ID sent to the user 14 to the "real" proxy session ID and navigate end user 14 to an internal URL address.

Although the scope of the present invention is not limited in this respect a user may wish to conduct a transaction, for example, open a banking account, purchase goods or other transaction. The user may log in to a dedicated web site via the Internet and may supply the user login and password. The system, for example, the banking online system, an institution server, may contact the user via a different channel, for example, via a mobile phone or a landline telephone and may provide the user with a secret, for example, a data element, a code, a word via the additional channel, for example, the system may supply the secret by SMS, a voice message or in any other way. The user may communicate the secret via the first channel to the system in order to log in the system and conduct the transaction.

Figure 2:
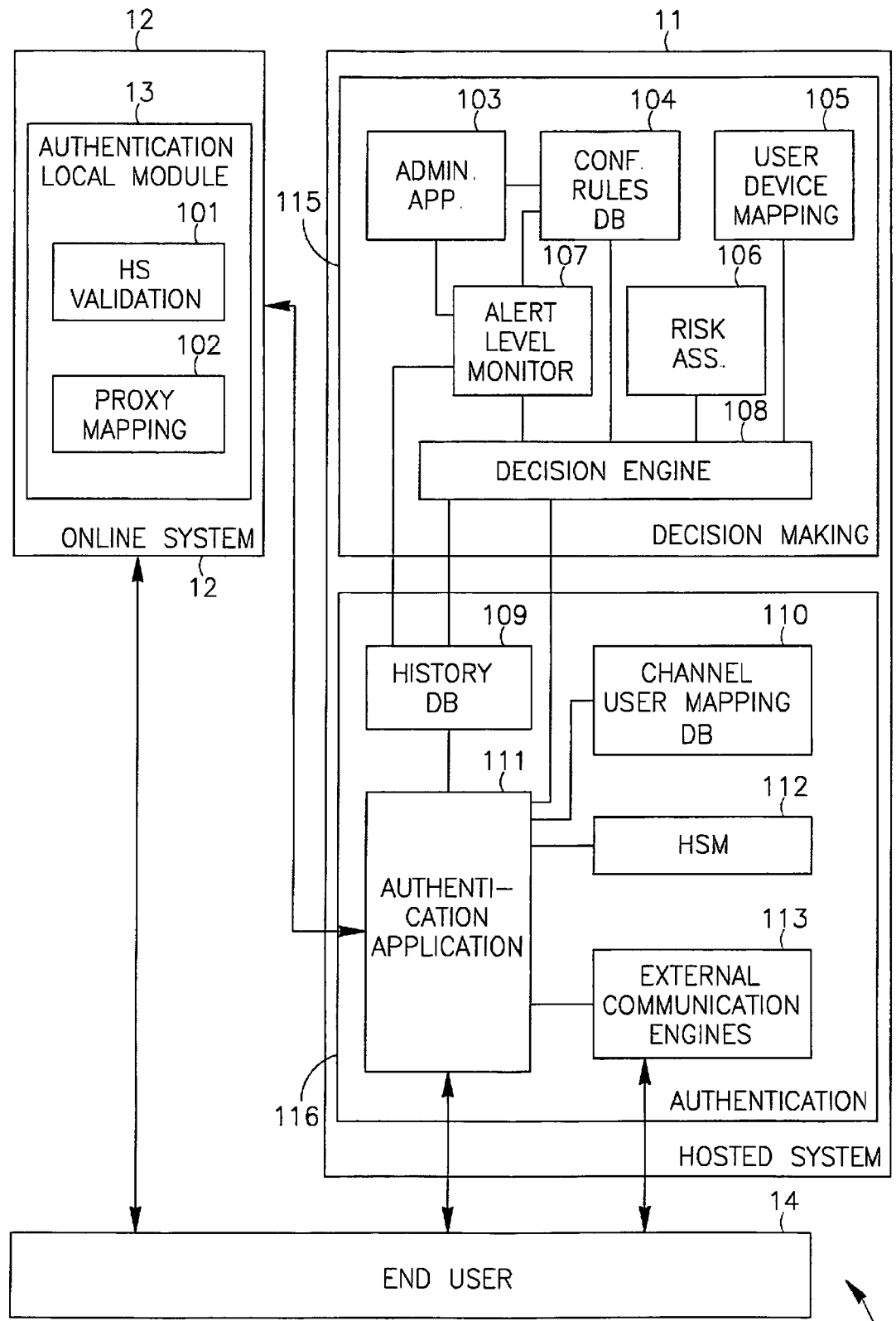
FIG. 2 depicts an authentication system according to one embodiment of the present invention.

FIG. 2 depicts an authentication system according to one embodiment of the present invention. While a specific structure with specific modules is shown, other suitable structures may be used, having different functionality. For example, an online system 12 separate from an HS 11 requiring the authentication analysis need not be used; such functionality may be performed at an institution, HS or possibly by human personnel.

Referring to FIG. 2, an overall authentication system 10 may include an online service system 12 and a Hosted system 11. OS 12 may include authentication local module 13 which may be, for example, a plug in, a shell or other software. Authentication local module 13 may include, for example, cryptographic validation capability 101, and a mapping module 102 to map session information to proxy session information. The authentication local module 13 may interface with the transaction system of an institution, or a HS 11 and may allow the transaction system to communicate with a separate or remote authentication system.

The authentication module 116 may include or be associated with an authentication application 111, a history database 109, a channel user mapping database 110, external communication engines 113 and an HSM 112. Other components or sets of components may be used. The various databases may be implemented in known manners, and may be spread among one or more databases. Other databases may be used, and other information may be stored. Authentication application 111 may communicate with the end user 14 and may display the authentication procedure on the end user 14 terminal. In addition the authentication application 111 may communicate with the authentication local module 13 and may sign the messages that may be transferred to the authentication local module 13, for example cryptographically. The authentication application 111 may log information into history database 109 and may send information, for example, channel information to the user device mapping unit 105. Furthermore authentication application 111 may generate the completion code for the authentication and communicate with the decision engine, for example, may initiate a decision request, may receive a decision response whether the out of band authentication should take place. In some embodiments of the present invention authentication application 111 communicate with an external communication engine 113 to initiate an out of band authentication or out of channel communication, for example, SMS, voice messaging and the like, and may compare the completion codes received with those sent to complete authentication. The history database 109 may receive information, for example, rules that were active during specific transactions, actions which the decision engine 108 may decide to take and changes in alert level from, for example, the authentication application 111 and the alert level monitor 107. In addition the history database 109 may communicate with the administration application 103 to enable viewing of system reports. Other databases may be used, and other information may be stored. The HSM 112 may store the signing keys in a secure manner and may communicate with the authentication application 111. The external communication engines 113 may receive information regarding a specific transaction, for example, a channel and a completion code from authentication application 111 and may send the information, for example the completion code to the user via the channel received from the authentication application 111. The channel user mapping database 110 may hold listing of users and their channels and may receive user information and channel, for example, a mobile device number, a telephone number or other channel, from the authentication application 111 and may return an answer after it may check if the channel is open for use to the authentication application 111.

The decision making module 115 or decision engine 108 may include or have their functionality implemented by for example a controller, or a number of controller, operating software. The decision making capability may be divided among a set of modules and locations.

The decision making module 115 may include or be associated with an administration application 103, an alert level monitor 107, user device mapping 105, a rule based configuration database 104, a risk assessment module 106 and a decision engine 108. Other components or sets of components may be used. The various databases may be implemented in known manners, and may be spread among one or more databases. Other databases may be used, and other information may be stored. In other embodiments, the information kept on users may differ, and out of channel or out of band authentication may not be based on user or alert information. For example, each and every transaction or user may be required to go through out of channel authentication.

The alert level monitor 107 may monitor and determine the level of alert of a specific transaction by for communicating with other modules. The alert level monitor 107 may for example, receive information regarding successful and failed authentication from the authentication application 111, communicate with configuration rule based database 104 to determine alert level, and may send the current level of alert to the decision engine 108 and to the history database 109. In addition in some embodiments of the present invention alert level monitor 107 may provide the administration application 103 with notifications on changes in alert level, and may receive orders from the administration application 103, for example, orders leading to change the alert level. The rule based configuration database 104 may contain configurable and priority rules, for example, use of out of band authentication, rules for moving from one alert level to another and any other rule. The rule based configuration database 104 may communicate with other modules, for example, may provide the alert level monitor 107 with the rules, for example, to which the alert level should change, may provide information to the decision engine 108, for example, to indicate what percentage of users should be free from suspicion in the current alert level. In some embodiments of the present invention other modules may communicate with the rule based configuration database 104, for example, the administration application 103 may change the configuration and priority rules. The administration application 103 may provide a user administration, for example, a system administrator, for the service. The administration application 103 may communicate with other modules, for example, the alert level monitor 107 which may, for example, provide the administration application 103 with notifications on changes in the alert status and may receive orders from the administration application 103 to change the alert level. In addition, administration application 103 may provide monitoring capabilities for the administrator by communicating with other modules, for example, the alert level monitor 107, the history database 109 or other modules. The risk assessment modules 106 may provide general risk assessment and specific information based on, for example, fraud alerting, detection application, risk evaluation tools, for example, geo-location, transaction velocity and the like. In addition the risk assessment modules 106 may receive a risk assessment request from the decision engine 108 and may send back a response. The user device mapping 105 may track users and devices, for example, may activate comparison algorithms to map the user to a device using multiple techniques, for example, IP address comparison, cookie analysis and the like. Furthermore the user device mapping 105 may contain a user device mapping database which may contain, for example, the history of each user, each device and the links between them. In some embodiments of the present invention the user device mapping 105 may receive a user's and device's details from the decision engine 108 and may send the result of the user-device mapping to it.

The decision engine 108 may decide whether a transaction requires out of band authentication based on a request from, for example, authentication application 111 or any other unit and on information collected from information sources, for example, the alert level monitor 107, the rule based configuration database 104, user device mapping 105 and risk assessment module 106. After a decision is made by the decision engine 108, information regarding the decision may be sent to the history database 109 by the decision engine 108.

The functionality of decision engine 108 or other modules may be executed in different suitable manners, for example by using software executing on processors.

The functionality of various components, such as the administration application 103, the alert level monitor 107, the user device mapping 105, the risk assessment module 106, the decision engine 108, the external communication engines 113 and the authentication application 111, may be performed by suitable computing devices such as a processor or controller, or if computation is more dispersed, by a combination of processor or controller and/or processor or controller, or other modules. Various steps of methods according to embodiments of the present invention may also be carried out by personnel at one of the institutions or facilities described.

As referred to in this description of the invention the term "Transaction" or "Transactions" may refer to any of the following non-limiting examples of online or other transactions, interactions, enrollment to a service, re-enrollment and password recovery using some sort of authentication/challenge or use of various services. It should be noted that the term Transaction is applicable not only to "financial" transactions but to any transaction involving authentication. For example, without limitation, Transaction refers not only to transactions such as an online banking login, but also to a company extranet login. It should be applicable to any transaction where the user is being authenticated by some means, regardless of the purpose of the authentication. Without limiting the foregoing, the following list illustrates certain types of transactions it may apply to: (1) Online enrolment, such as financial account opening: banking, brokerage, and insurance; subscriptions for example for ISP, data and informational content deliveries; customer service enrollment; enrollment to Programs (partnership, MLM, beta, etc.) and any other similar type of transaction; (2) Online transactions such as Online Purchasing, B2B, B2c and C2C transactions; Electronic Bill payment; Internet ACH providers; Money transfers between accounts; Online brokerage trading; Online insurance payments; Certain online banking transactions; Tax filing or Any other similar type of transaction; (3) Online Applications such as for credit cards; loans; memberships; patent applications or information; Governmental applications or other similar type of transactions; (4) Online password resetting, as well as online change or update to personal data by re-authentication/re-enrollment; by combining a mechanism involving secret questions; or by a combination of the above; (5) any login to a restricted service, or other operations that involve an element of risk. Other suitable transactions may be included as well.

The following examples of the use of an embodiment of the invention are only examples, which are intended to illustrate specific implementations of a method according to one embodiment. They are in no way intended to limit the applicability of this method to a certain field, or to a certain type of Transaction, or even to a certain type of authentication method, or to a type of adjustment to the authentication level.

An embodiment of the current invention may enable two factor authentications using a communication channel that may meet certain criteria, for example as follows (other operations or series of operations may be used):

1. The plug in may be activated after a user has successfully logged into a system such as the HS 11 system 2. The plug may receive from the HS 11 the following data elements (other suitable elements may be used):
   a) A User ID
   b) A brand ID (which may enable proper branding of the HS screens as well as per brand configuration rules and alert level detection)
   c) Session information, for example whether the user may be required to continue the login section
   d) Two or more internal URLs which may indicate, for example, to where the HS 11 should navigate after completing the authentication process, for example, the OS 12 online welcome page, and in case of an error in the authentication process the OS 12 error page.
   e) In some embodiment, data that exists on the HS 11 databases such as a list of telephone numbers on record.

3. The plug in may check data element, for example, the brand ID, the user ID, or any other data element against a configuration file for participation in the service, this may enable piloting the service or specific treatment of VIP clients. If the specific element for example, the brand ID, the user ID is not participating, the plug-in may continue to the internal URL supplied. Alternatively, all traffic can go to the hosted service, and the decision can be made there. If the brand and user are participating—

4. The plug in may connect to a "proxy session ID" generator, which links the session with a proxy number that may be used instead while communicating with the HS 11 for security reasons.

5. The plug in may send an HTML page that redirects the user's browser to the HS 11, along with the additional information, for example, Brand ID, user ID, proxy session ID, plug-in return URL and the like. The user may then be redirected to the HS 11 in specific to the authentication application 111.

6. The authentication application 111 may contact the decision engine 108 and may send the decision request. The request may include, for example, the brand ID and user ID, as well as any device identifiers available such as IP address, cookie value or any other identifier.

7. The decision engine 108 may pull information from several modules, for example:
   a) The alert level monitor 107, for example, the decision engine 108 may query the current alert level.
   b) The rule based-configuration module 104, for example, the decision engine 108 may pull the configuration rules that may apply at this time.
   c) The risk assessment modules 106, for example, the decision engine 108 may send characteristics, such as, for example, the user ID, the brand ID and IP address. The risk assessment module 166 then may send a risk score to the decision engine 108.
   d) The user device mapping 105; in particular the user-device tracking engine. For example, the decision engine 108 may send characteristics such as, for example, the user ID, Cookie information and IP address. The user-device engine then may perform a check against the user-device DB in the user device mapping 105, and may send an answer to the decision engine 108.

8. The decision engine 108 may come to a decision based on, for example one or more of:
   a) The alert level.
   b) The configuration rules for example, current number of users that were authenticated via HS 11 out-of-band authentication.
   c) The risk score
   d) The device-user mapping.

9. The decision engine 108 may send the decision to the authentication application 111. In case no authentication is to take place, the authentication application 111 may sign the response and may send, for example, an HTML page that may redirect the user's browser to the HS 11. Along with the response other characteristics may be sent, for example, Brand ID, user ID, proxy session ID, and the authentication code (for example, waived). This message may be signed using the HS 11 private key.

10. In case authentication should take place, the authentication application 111 may display, for example, an HTML page requesting the customer to enter additional channel information, for example, a telephone number, an email address, etc. In some embodiments previous numbers or channels may be stored in the user channel mapping database 110, and the authentication application 111 may offer the user to either use one of them or to enter a new one 11. The additional channel, for example, a telephone number may be sent with other characteristics, for example, the user ID to the channel-user mapping database 110.

12. The channel-user mapping database 110 may check if the additional channel, for example, the telephone is open for use (e.g., if the system knows of this channel and does not permit its use, it may not be used) and may return an answer. If the additional channel is not open, the authentication application 111 may display an error page on user 14 terminal. In some embodiment of the invention the user 14 may be able to enter an additional channel, for example, a telephone number a predetermined number of times, after which the login may fail; the authentication application 111 may sign the response and may send, for example, an HTML page that redirects the user's browser to the HS 11, other characteristics may be sent along with the response, for example, Brand ID, user ID, proxy session ID, and the authentication code (for example, failed). This message may be signed using the HS 11 private key. In case the additional channel, for example, the telephone number may be open for use, the channel-user mapping database 110 may link it to the particular users 14.

13. The authentication application 111 may generate a completion code and may send it along with the additional channel, for example, a telephone number to the relevant external communication engine 113.

14 The communication engine 113 may send the completion code to the user 14.

15. In parallel with sending the completion code, the authentication application 111 may display a page requesting the user 14 to enter the completion code.

16. The user may use the additional channel to contact the authentication application 111 or another entity and enter the completion code. For example, the user may telephone the authentication application (e.g., speaking with a live operator or a computer capable of understanding speech or telephone keypresses) and enter the completion code, or may SMS the completion code to the authentication application 111. The user 14 may be able to enter the code a predetermined number of times, after which the login may fail. The authentication application 111 may sign the response and may send an HTML page that redirects the user's browser to the HS 11, other characteristics may be sent along with the response, for example, Brand ID, user ID, proxy session ID, and the authentication code, for example, failed. In some embodiments of the invention, the user 14 may also indicate that he did not get the completion code, and may request it to be sent again to the same device, or enter another channel or telephone number.

17. In case the user 14 entered the completion code successfully, the authentication application 111 may sign the response and may send an HTML page that redirects the user's browser to the HS 11, other characteristics may be sent along with the response, for example, Brand ID, user ID, proxy session ID, and the authentication code, for example, successful. This message may be signed using the HS 11 private key.

18. The plug in may verify the signature as a security measure, and may connect to the "proxy session ID" generator, which may switch the proxy session ID with the real one.

19. The plug in then may navigate the user 14 to the appropriate internal URL, for example, a welcome page, an error page according to the authentication results, for example, waived, successful, to the welcome page, and Failed, bad to the error page.

20. The history database 109 may log any information regarding the authentication process, for example, the decision, the rules that led to it and any other information.

21. The authentication application 111 may notify the alert level monitor 107 of the results of the authentication process.

Other operations and series of operations may be used. In addition, other entities may perform the above operations. For example, a financial institution may perform all the operations of a method according to an embodiment of the present invention, without the use of a plug-in or a separate entity.

Figure 3:
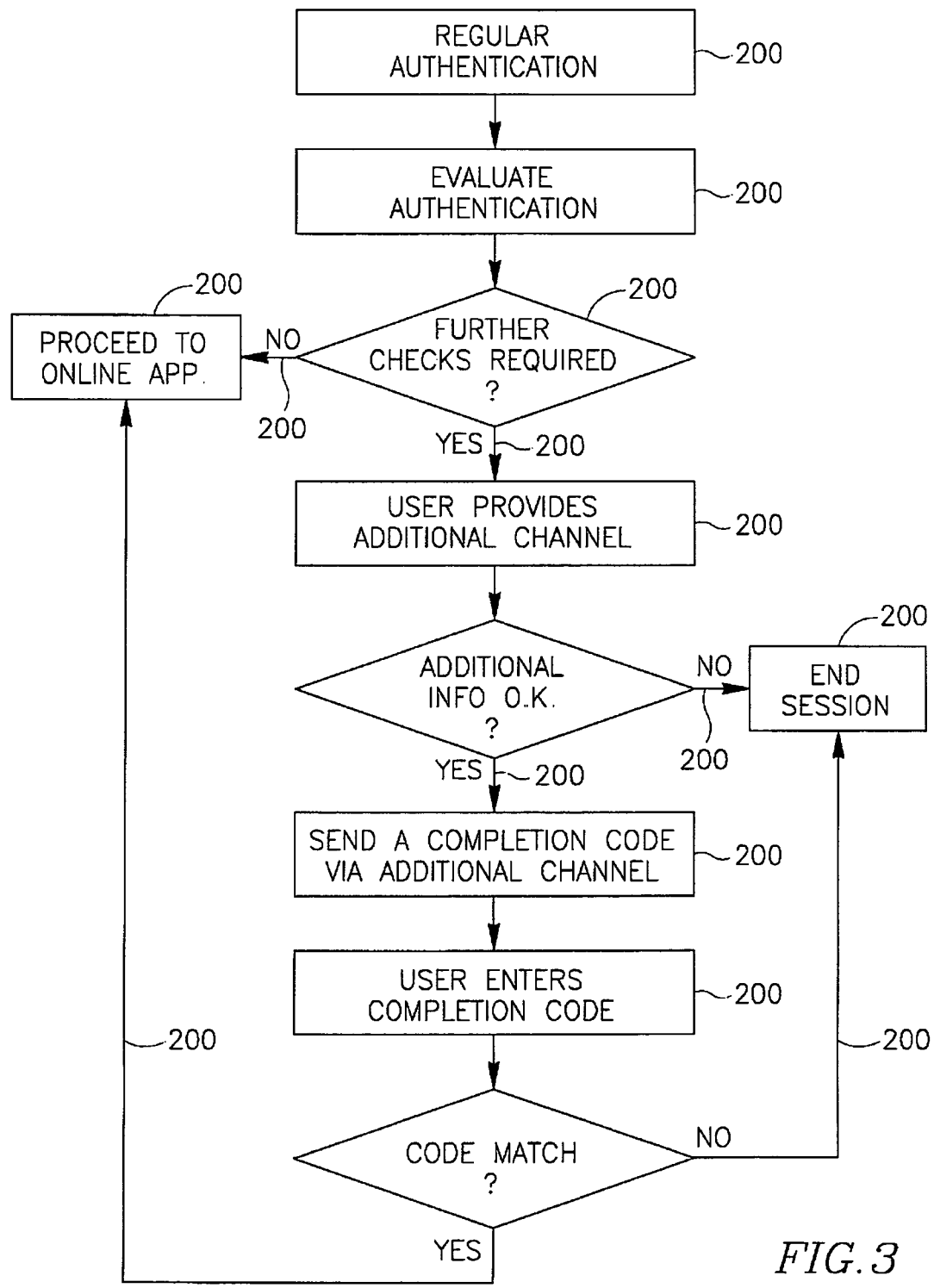
FIG. 3 is a flowchart depicting a process according to an embodiment of the present invention.

FIG. 3 is a flowchart depicting a process according to an embodiment of the present invention. FIG. 3 may be effected by, for example, the embodiments shown in FIGS. 1 and 2, but may be effected by other suitable systems. Referring to FIG. 3, in operation 200, a user may wish to access an institution in order to receive service. For example, a user makes a request to open an account, pay a bill, transfer funds, or purchase goods from an institution. A user may authenticate itself using acceptable credentials "regular authentication" for example, user ID, user password and the like. In operation 210, after the "regular authentication may be completed successfully, each authentication transaction may be evaluated as to whether it requires further checks. The evaluation may be done by a decision engine 108 based on information from various units of the HS 11, for example, alert level monitor 107, rule based configuration database 104, risk assessment module 106 and authentication application 111. Other methods of evaluation may be done, and such an evaluation need not be done (for example every customer or user may participate in a further check).

In operation 220 a decision may be made whether further checks are required, for example by the decision engine 108. In case no further checks required as indicated in allow 221, for example, when the alert level is low or the user has unique characteristics, the user may proceed to the online application as indicated by block 290. Arrow 222 indicates that further checks may be required in order to continue the authentication process.

In operation 230 the user or customer may be asked for additional authentication via an additional communication channel, for example, a mobile device number, a land telephone number or any other communication channel. In block 240 the authentication application 111 may contact other modules or unit of the HS 11 in order to check that the information supplied by the user for the additional channel may be used, for example if the telephone number supplied is not associated with a number of accounts or other elements of the system. This is necessary in order to prevent fox example a fraudster from executing massive fraud. If the additional information supplied is not accepted as indicated in arrow 223 the user session may be closed. Such authentication of the additional channel itself need not be used. In some embodiment of the invention user may be asked to supply a different channel and try again for several times before the system may end the session.

In operation 250, in case the additional information, in particular the additional channel, was found to meet the system criteria, the external communication engines may send a completion code or other information to the user via the additional channel supplied. In other embodiments, a completion code need not be used; for example, the user may simply use the second channel to discuss the transaction with an operator, who provides authentication. In addition the user may be asked to provide the completion code to the system by the first channel, for example, by inserting the code received by a telephone to the web site of the institution.

In operation 260 a user may use the second channel to enter the required completion code or otherwise authenticate the transaction. For example, the user may place a telephone call to an authentication system or an operator, and may use the code. In block 270 the authentication system 10 may check that the completion code matches the code that was sent via the additional channel by for example the authentication application 111. In case there is no match as indicated by arrow 225 the session authentication system 10 may end the session as indicated on block 280. If the match succeeded as indicated in arrow 270, the user may proceed to the online application system OS 12 as shown in block 290. Other operations or series of operations may be used. Furthermore, systems and modules other than described above may be used to perform a method as described herein. Other operations and series of operations may be used. In addition, other entities may perform the above operations. For example, a financial institution may perform all the operations of a method according to an embodiment of the present invention, without the use of a plug-in or a separate entity.

Figure 4:
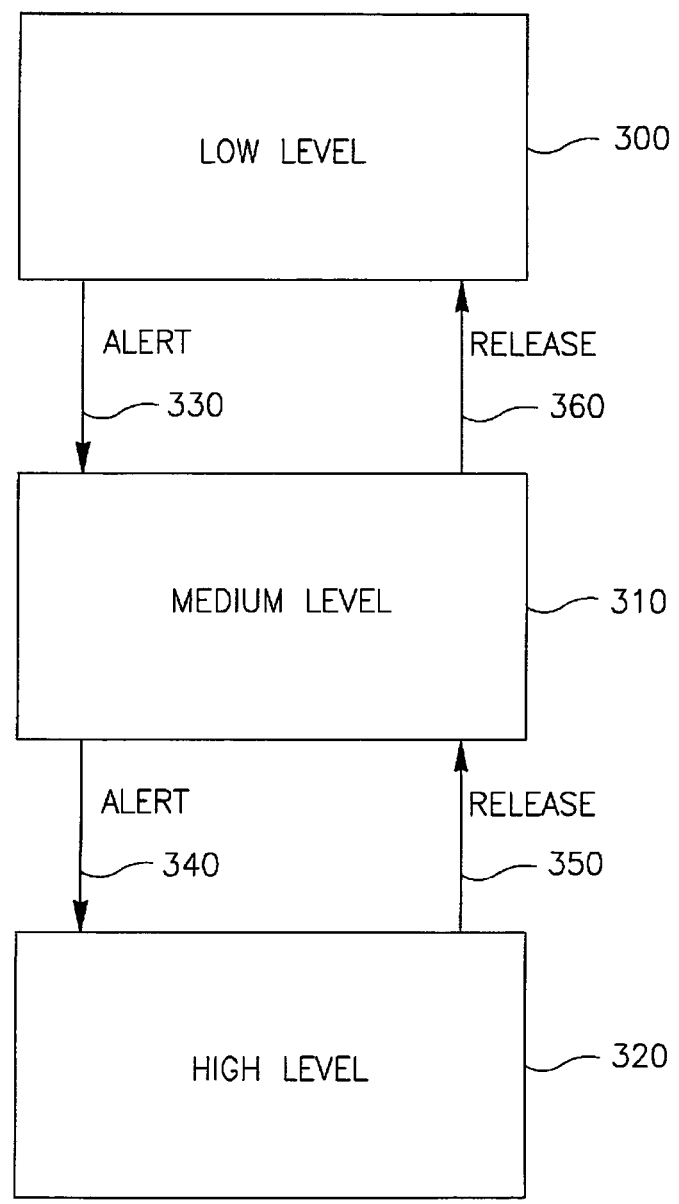
FIG. 4 is a flowchart depicting a process for moving between alert levels according to an embodiment of the present invention.

An embodiment of the present invention may define alert levels in the system. Each alert level may represent a certain level of threat. An embodiment of the present invention may not require out of band authentication from all users at all times, it may perform a per-user decision and may take into consideration the current alert level of the system. FIG. 4 is a flowchart depicting a process of moving between alert levels according to an embodiment of the present invention. FIG. 4 may be effected by, for example, the embodiments shown in FIGS. 1 and 2, but may be effected by other suitable systems. FIG. 4 illustrates three alert level, other numbers and types of alert level may be used.

The alert level may be altered based on input from several sources, that may be external to an embodiment of the invention, for example, the FI may indicate there may have been a theft of credentials, or may suspect of such a theft, a special fraud detection services, or an activity in an embodiment of the invention itself may provide a mean to increase or release alert levels. Referring to FIG. 4, in block 300, the system may have a low alert level. Even in low alert levels, the system may randomly select a small percentage of customers and ask them to perform an out-of-band authentication. This method is effective and relatively non-intrusive, especially since after a successful authentication may take place users may be exempt from out-of-band authentication when using the same device. The system may raise the alert level when, for example, more than a predefined percentage or number of customers may fail to perform out-of-band authentication in defined period as indicated in arrow 310. In block 320, after the system may have raised alert level, the alert level may be defined as medium alert level. The system may raise the alert level when, for example, more than a predefined percentage or number of customers may fail to perform out-of-band authentication in defined period as indicated in arrow 330. In block 340, the alert level may be defined as high alert level, in which a higher percentage of the customers, up to 100%, may be asked to perform out-of-band authentication. The system may lower or release the alert level as indicated in arrows 350 and 360 when, for example, more than a predefined percentage or number of customers succeed in performing out-of-band authentication in a defined period. Any percentage or number of user and any period of time mat be used for raising or lowering alert level. The system may decide the customer was unable to perform out-of-band authentication if a set of condition may not be met, for example, the user or customer may have entered the correct regular credentials, for example, login name and password, and may not be able to supply a valid and not taken telephone number to perform an out-of-band authentication.

While there may be other possible reasons for this pattern of behavior, when it may exceed a certain pre-defined level, it may be suspicious, as this may be precisely the pattern one would expect in a case of credential theft, for example, the credentials may be correct, however the channels may be hard to come by.

An alert level may be general per institution (e.g., FI), or may be related to specific sectors within the FI. For example, if the credentials that may have been stolen all belong to a certain affinity or product, there may not be a reason to raise the alert level for all the users of the FI. If there may be information on the theft which may link it to a specific location, the alert may be raised only for users that access the service from these locations. The decision rules may be fed into an embodiment of the invention either automatically from other systems or service connected to the HS 11, or manually via an administrator application, or in any other method.

While the authentication process of an embodiment of the invention may be simple and user-friendly, it may be still desired to refrain from repetitive out-of-band authentications if there may be good enough reason to believe the user may be indeed the FI customer and not a party intending fraud. This may have the effect of both lowering the costs of running the service, for example, less SMSs or outgoing calls, and reducing intrusiveness on customers. Therefore an embodiment of the present invention may perform a per-user decision, for example, the basic idea may be to refrain from out-of-band authentication for a user that may have perform such an authentication in the recent past from a familiar device, and then may log in again from such a device. To identify the device an embodiment of the invention may utilize several methods, for example, methods relevant for PCs. For other devices, other types of identifications might be used, such as, for example, caller ID in case of call center calls, or an ATM network ID in case of ATMs.

1. IP identification:
   a) The system may collect past IP addresses of successful out-of-band authentications per user.
   b) The system may compare the IP of the incoming authentication to the list, for example, the comparison may be done on the class C subnet of the IP address, other types of comparisons may be done on the IP, for example, we may check that it may have been issued by the same ISP, and for the same geographical area as the first IP. This way, we may recognize that both IPs may come from a certain ISP in a certain location and approve it. In case a match is reached, no out-of-band authentication may be required.
   c) IP addresses may also be added to the list by the FI, based on previous records of the user.
   d) Known suspicious IP addresses may be closely watched and may either be blocked all together or may be trigger an out-of-band authentication request.
2. Cookie usage:
   a. After a successful authentication, an encrypted cookie may be uploaded to the user's computer. The cookie may contain a list of user IDs. Alternatively, the cookie may contain a cookie ID, and the system may retain a list of cookie ID for user associations, similar to the IP address for user association described in the previous section.
   b. On subsequent login attempts, an embodiment of the invention may check the user ID against the list in the cookie. If it is identical, no authentication may be required.

Although the scope of the present invention in this respect, this method may work as long as the device may not be protected against cookies and the user may not erase cookies from the device. Furthermore, the user-device mapping may add an additional layer of authentication. Any other element identifying the device it may be used as well.

In some embodiments of the invention, authentication may be extended to a two-factor out-of-band form by requiring an additional piece of data to be transmitted through a different channel, or by requiring any other type of proof that a user may have access to a second channel. The characteristics of that channel may be that on the one hand it may be difficult and/or expensive to get hold of in large quantities, but on the other hand it may be widely available (otherwise it may be necessary to expend costs on making it available). Unlike the conventional thought behind double factor authentication, the channel may not have to be uniquely linked to the user, and it may be not necessary to establish ownership or any other relationship between the user and the additional channel. Although the scope of the invention is not limited in this respect, the implication of this may be that there may not be a need for prior distribution of hardware or education of users. Out of band authentication may therefore be deployed precisely when needed, in which case it will be effective for all users immediately. To achieve security, an embodiment of the invention may limit the number of different accounts or limiting number of users, or SSNs or any other identifying factor that may use the same access point to a particular channel (e.g., the same telephone number). Without limiting the foregoing, for example, no more than N users could be permitted to use a particular telephone number for the sake of such authentication.

Although the scope of the present invention is not limited in this respect an embodiment of the invention may not require out-of-band authentication from all users all of the time. An embodiment of the invention may accommodate various levels of alerts, whether those may be real, or may be set on purpose by the user of the service, which may define the extent of its use. According to one embodiment of the current invention, when a high alert level exists, all users may be required to perform out-of-band authentication. According to another embodiment of the current invention, upon high alert level, users who successfully authenticated themselves pursuant to an embodiment of the invention may be exempt from repeat authentication when accessing from the same location. In some embodiments of the invention, upon medium alert level, either certain or all users may be required to authenticate themselves. Upon low alert level, the FI may decide whether to deploy out of band authentication with respect to any category or portion of users, in order to collect information from users ahead of time, or for research reasons, as well as in order to facilitate selective deployment at a later stage. It may also decide to deploy it on a narrow scale in order to sense the alert level.

Although the scope of the present invention is not limited in this respect, embodiments of the invention may be used for password recovery. It is possible to use an embodiment of the invention's user-device mapping and user-phone number mapping as a means to help recover a password:

1. After a successful authentication by the proposed system, the system may contain a user-device mapping, which may use the IP address and/or cookie, and a user-phone mapping.

2. When a user may try to login from a familiar device, and may forget the password, the system may send a one-time password via the telephone number registered 3. The user may enter the one-time password and may create a new password.

This extension may require an updated telephone list the user may be allowed to update the telephone number after logging into the system. The system may occasionally initiate such updates by sending reminders to the users. Updates may be allowed in this case only from familiar devices.

In some embodiments of the invention, a telephone may not be the primary channel for authentication, although a telephone may be available to a large number of users and may be difficult to acquire in large amounts. It may be possible to extend the channel variation and include less difficult to acquire channels, such as emails. To do so, however, one may add security measures. One such measure may be to require the channel to be of a certain age. This limitation may be used in addition to the limit on the number of users per channel. The evaluation of the channel age may be done using, for example, publicly available databases, APIs to major email providers, or other options.

In some embodiments of the invention, for some channels, there may be a possibility to retrieve the name of the person who "owns" the channel, for example, the mobile phone's owner name. This name may be cross-referenced against the name of the person who may own the account at the FI in order to provide an additional level of security.

In some embodiments in case the FI may already have channel information on file, for example the customer's telephone number that may be used, either as a default or as the only option. The latter may provide higher security however may be problematic if the telephone number is incorrect, outdated or simply may not be accessible at the moment of logging into the FI application. In some embodiments of the invention a mobile phone may not be used for various reason, for example, a user may not own a mobile phone, a user may operate from places where no mobile coverage or where mobile phones may not be allowed. In such embodiments, the system may support additional channels, such as, for example, landline telephone, which may be available to anyone transacting online. The system then may not use SMS but instead may initiate a call using an automated voice messaging mechanism. In some embodiments a single owner of a channel may have multiple accounts; in such embodiments the system may not put a 1-account limit per channel The number may be limited to a number greater than that, while maintaining high security. The number may be a FI configurable and may be also different between channels, for example, a land line usually serves mote people than a mobile phone. In addition, if an optional mapping of user account per name may be provided by the FI, the system may be configured to limit the number of different names a single channel may be mapped to, as opposed to simply the number of different user accounts.

Embodiments of the present invention may be effective for remote financial or non financial applications, for example, account opening or loan applications may link the channel to SSN or to name and address when no SSN may be available, E-Commerce (via 3D-Secure) may link the channel to a 3D-Secure user, MOTO transactions and non 3D-Secure E-commerce may link the channel to a PAN, E checking may link the channel to a DDA, Call center operations may link the channel to either the PAN, the account number, or any other account/user id, or may use caller ID for user per device mapping, ATMs may link the channel to the PAN, or may use ATM physical or network location for user per device mapping. Over time, cross linking many personal IDs with the user's phone numbers may produce a network effect with better security and better economy of scale.

Although the scope of the invention is not limited in this respect, in case no threat of fraud is sensed, a service provider may elect to operate, using credentials via the regular single communication channel as the only means for authentication. However when faced with a fraud alert, using credentials only may not provide sufficient security.

In some embodiments, service providers may know of various levels of fraud alert, and may act accordingly, implementing their contingency plans which may be appropriate to a given level of alert. For ease of exposition the current description may refer to 3 levels of alert, but any number of alert levels may be used: (i) no alert (e.g. business as usual); (ii) suspected fraud—medium level alert; (iii) actual (e.g., massive) fraud—high level of alert. Other numbers and types of alerts may be used.

Embodiments of the current invention may create an efficient and cost-effective solution, which may:

May provide adequate security.

Is non-intrusive—may be deployed on demand and not burden all customers all of the time May require low deployment and operation costs Other or different benefits may be achieved. It will be appreciated by persons skilled in the art that the present invention is not limited to what has been particularly shown and described hereinabove. Alternate embodiments ale contemplated which fall within the scope of the invention.

What is claimed is:

1. A computerized method of authenticating a user participating in an electronic transaction, the method comprising:
   receiving, by a first computer, a request by a user on a second computer to participate in an electronic transaction;
   obtaining, by the first computer, a transaction risk level related to the transaction;
   comparing, by the first computer, the transaction risk level of the transaction to the obtained threshold risk level;
   determining, by the first computer, whether the obtained transaction risk level of the transaction is less than the received threshold risk level or greater than the received threshold risk level;
   based on the determining that the obtained transaction risk level of the transaction is less than the received threshold risk level, completing the user requested transaction;
   based on the determining that the obtained transaction risk level of the transaction is greater than the received threshold risk level, the method further comprises:
   generating a data element;
   transmitting, by the first computer, the data element to said user via a first electronic communication channel;
   receiving, by the first computer, the data element from the user via a second electronic communication channel;
   determining, by the first computer, that the data element transmitted via the first communication channel matches the data element received via the second communication channel;
   completing the electronic transaction by the user;
   storing, by the first computer, a list of user IDs in a cookie;
   sending, by the first computer, the cookie to the second computer;
   determining, by the first computer, a successive login attempt by the user; and
   based on the determining of successive login attempt, reading the cookie and checking a user ID of the user against the list of user IDs stored in the cookie.

2. The method of claim 1, wherein the data element is a code.

3. The method of claim 1, wherein one of the communication channels is the Internet.

4. The method of claim 1, wherein the identity of one of the communication channels is provided by the user.

5. The method of claim 1, wherein the one of the communication channels is a telephone connection.

6. The method of claim 1, wherein one of the communication channels is an email connection.

7. The method of claim 1, wherein transaction is a financial transaction.

8. The method of claim 1, wherein one communication channel is the Internet and the other communication channel is a telephone connection.

9. The method of claim 1, wherein the one of the communication channels is used to perform the transaction.

10. The method of claim 1, comprising initiating contact with the user via the one of the communication channels.

11. A system for authenticating an electronic transaction with a user, the system comprising:
    a first computer having a processor;
    computer readable instructions stored on a non-transitory medium, which, when executed by the processor, causes the processor to perform the acts of:
    receiving, by the first computer, a request by a user on a second computer to participate in an electronic transaction;
    obtaining, by the first computer, a transaction risk level related to the transaction;
    comparing, by the first computer, the transaction risk level of the transaction to the obtained threshold risk level;
    determining, by the first computer, whether the obtained transaction risk level of the transaction is less than the received threshold risk level or greater than the received threshold risk level;
    based on the determining that the obtained transaction risk level of the transaction is less than the received threshold risk level, completing the user requested transaction;
    based on the determining that the obtained transaction risk level of the transaction is greater than the received threshold risk level, the method further comprises:
    generating a data element;
    transmitting, by the first computer, the data element to said user via a first electronic communication channel;
    receiving, by the first computer, the data element from the user via a second electronic communication channel;
    determining, by the first computer, that the data element transmitted via the first communication channel matches the data element received via the second communication channel;
    completing the electronic transaction by the user;
    storing, by the first computer, a list of user IDs in a cookie;
    sending, by the first computer, the cookie to the second computer;
    determining, by the first computer, a successive login attempt by the user; and
    based on the determining of successive login attempt, reading the cookie and checking a user ID of the user against the list of user IDs stored in the cookie.

12. The system of claim 11, wherein the data element is a code.

13. The system of claim 11, wherein one communication channel is the Internet.

14. The system of claim 11, wherein the identity of one of the communication channels is provided by the user.

15. The system of claim 11, wherein one communication channel is a telephone connection.

16. The system in claim 11, wherein the processor further performs the acts of limiting the number of users enabled to use a specific access point to one of the communication channels.

17. The method of claim 1, further comprising, prior to completing the electronic transaction:
    checking whether an access point to the second communication channel is younger than a predetermined number of days; and
    invalidating the access point to the second communication channel in response to the access point being younger than the predetermined number of days.

18. The method of claim 1, further comprising, on one of the successive login attempts, completing the requested transaction without using the second electronic communication channel after determining that the transaction risk level of the transaction is greater than the threshold risk level when the user ID of the user is found in the cookie.

19. The method of claim 18, further comprising, on another of the successive login attempts, completing the requested transaction without using the second electronic communication channel after determining that the transaction risk level of the transaction is greater than the threshold risk level when the user of the second computer has successfully authenticated from the second computer in the recent past.

* * * * *